Dec. 15, 1970     J. TURNER     3,546,985
UNIVERSAL DRIVING AND CLAMP MOUNTING STRUCTURE
Filed Feb. 1, 1968     3 Sheets-Sheet 1

Jennings Turner
INVENTOR.

BY *Clarence A. O'Brien*
*and Harvey B. Jacobson*
Attorneys

Dec. 15, 1970    J. TURNER    3,546,985
UNIVERSAL DRIVING AND CLAMP MOUNTING STRUCTURE
Filed Feb. 1, 1968    3 Sheets-Sheet 2
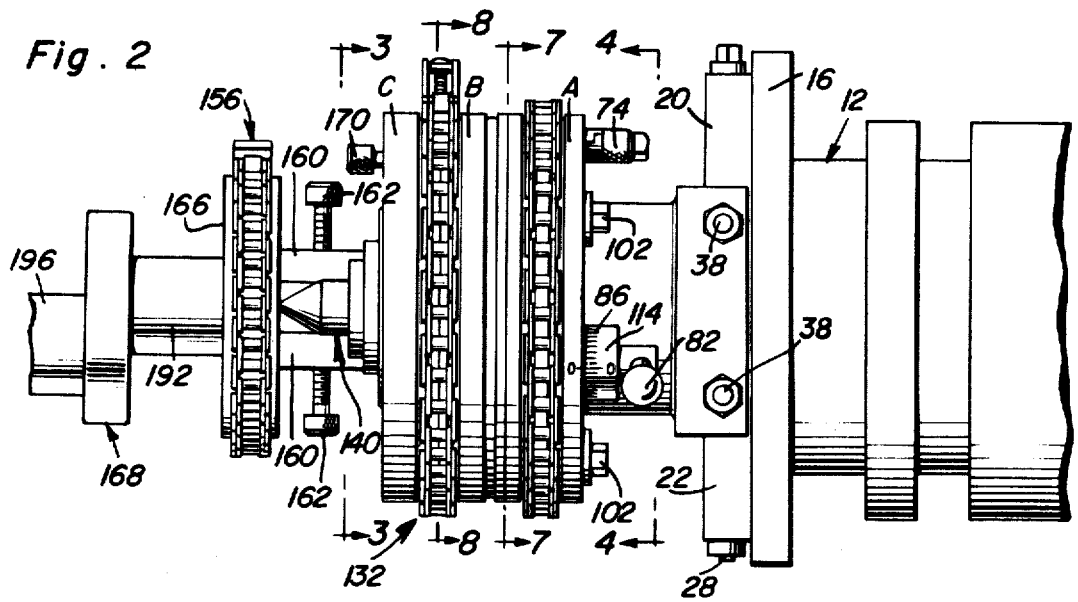
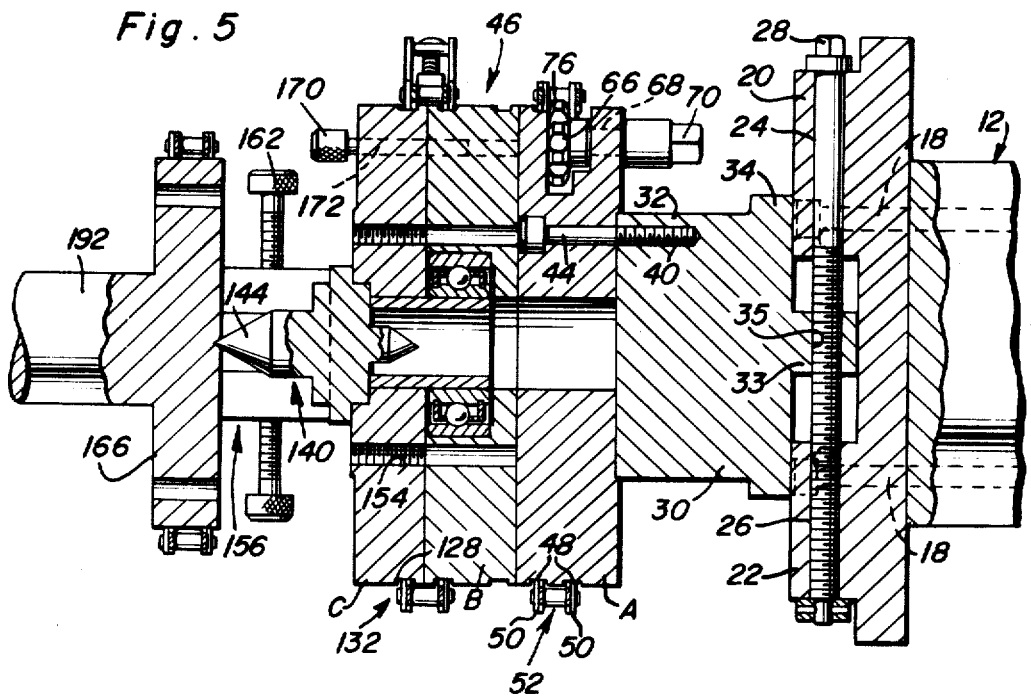
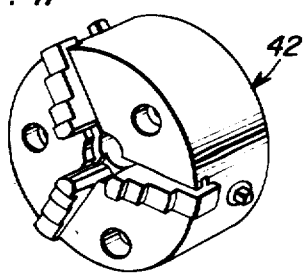
*Jennings Turner*
INVENTOR.
BY *Clarence A. O'Brien*
*and Harvey B. Jacobson*
Attorneys Dec. 15, 1970          J. TURNER          3,546,985
UNIVERSAL DRIVING AND CLAMP MOUNTING STRUCTURE
Filed Feb. 1, 1968                    3 Sheets-Sheet 3
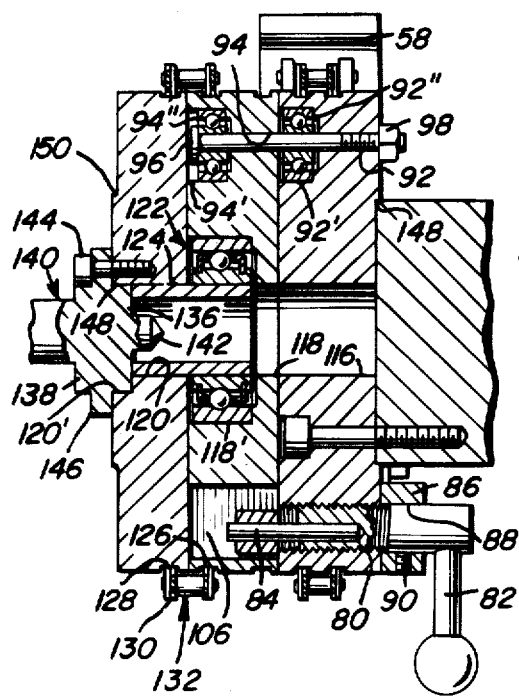
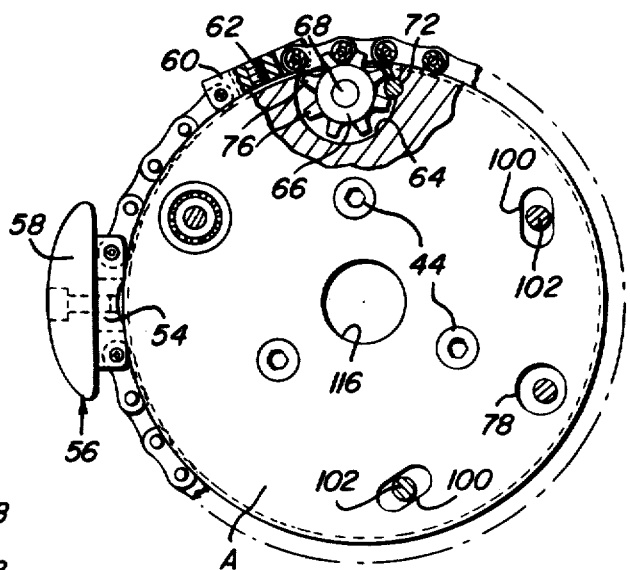
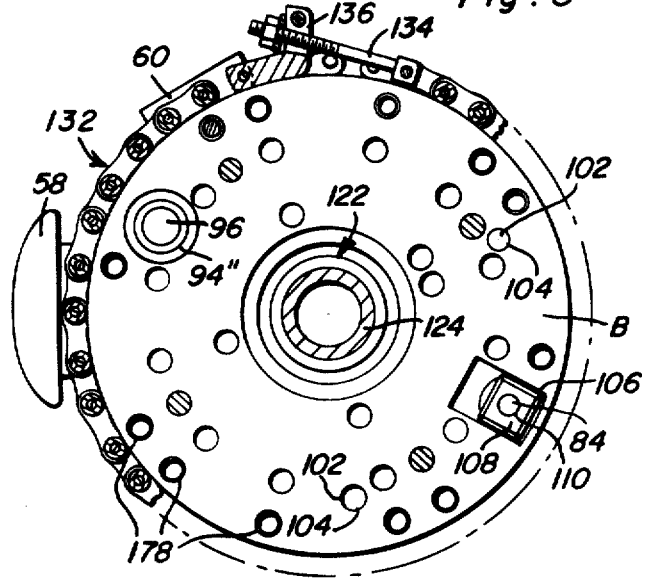
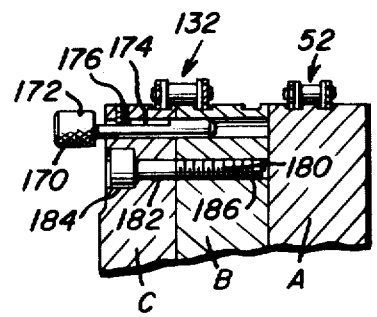
Jennings Turner
INVENTOR.

United States Patent Office 3,546,985
Patented Dec. 15, 1970

3,546,985
UNIVERSAL DRIVING AND CLAMP MOUNTING STRUCTURE
Jennings Turner, P.O. Box 255, Mayfield, Ky. 42066
Continuation-in-part of application Ser. No. 525,721, Feb. 7, 1966. This application Feb. 1, 1968, Ser. No. 702,445
Int. Cl. B23b 33/00
U.S. Cl. 82—40  10 Claims

ABSTRACT OF THE DISCLOSURE

A mounting member defining a center with which a workpiece is to be at least approximately centered and secured to a journalled support member for rotation therewith and for angular adjustment of the mounting member relative to the support member about an axis generally paralleling the axis of rotation of the support member as well as the center defined by the mounting member. The mounting member includes a support structure supported therefrom and adapted to supportingly engage a portion of a workpiece adjacent the mounting member approximately centered position relative to the center, the mounting member being mounted on the support member for angular adjustment relative to the support member about an axis generally paralleling the axis of rotation of the support member and as well as an axis generally coinciding with the center defined by the mounting member.

---

This application comprises a continuation-in-part of my copending U.S. application Ser. No. 525,721 for Universal Driving and Clamping Means, filed Feb. 7, 1966 and now Pat. No. 3,392,612.

This invention relates to a novel and useful clamp-type mounting structure by which a workpiece may be supported from the headstock of a lathe for predetermined angular indexing about an axis generally paralleling the axis of rotation of the headstock, rectilinear shifting in a path disposed generally normal to the axis of rotation of the headstock and angular adjustment about an axis generally paralleling the axis of rotation of the headstock but spaced transversely thereof.

The main object of this invention is to provide a mounting structure for mounting on a lathe headstock and adapted to support a workpiece to be turned in a manner such that the workpiece may be shifted laterally of the axis of rotation of the headstock.

Another object of this invention is to provide a mounting structure in accordance with the preceding object and which will be also operative to support the associated workpiece for limited oscillation about an axis spaced laterally of the axis of rotation of the associated headstock.

Yet another object of this invention is to provide a mounting structure in accordance with the preceding objects also including means by which the associated workpiece may be angularly indexed about a centrally disposed axis generally paralleling the axis of rotation of the associated headstock.

Another object of this invention is to provide a mounting structure including clamp means for supporting the associated workpiece and which is adjustable so as to accommodate various size workpieces.

A final object of this invention to be specifically enumerated herein is to provide a mounting structure in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary top plan view of a conventional form of lathe shown with the universal driving and clamp mounting structure of the instant invention mounted on both the head and tailstocks of the lathe and clampingly engaged with a crankshaft extending between the headstock and the tailstock of the lathe, the mounting structure carried by the headstock of the lathe being provided with an adjustable clamp-type structure for engaging the associated end of the crankshaft and the mounting structure carried by the tailstock of the lathe having a conventional chuck mounted thereon in lieu of the clamp structure;

FIG. 2 is a fragmentary enlarged side elevational view of the mounting structure carried by the headstock of the lathe;

FIG. 5 is an enlarged longitudinal vertical sectional view taken substantially upon a plane indicated by the section line 5—5 of FIG. 1;

FIG. 6 is a fragmentary sectional view taken substantially upon the plane indicated by section line 6—6 of FIG. 4;

FIG. 7 is a vertical sectional view taken substantially upon the plane indicated by section line 7—7 of FIG. 2;

FIG. 8 is an enlarged vertical sectional view taken substantially upon the plane indicated by section line 8—8 of FIG. 2;

FIG. 9 is an enlarged fragmentary sectional view taken substantially upon a plane indicated by section line 9—9 of FIG. 3;

FIG. 11 is a perspective view of a conventional form of chuck which may be utilized on the mounting structure in lieu of a clamp-type support.

Figure 1:
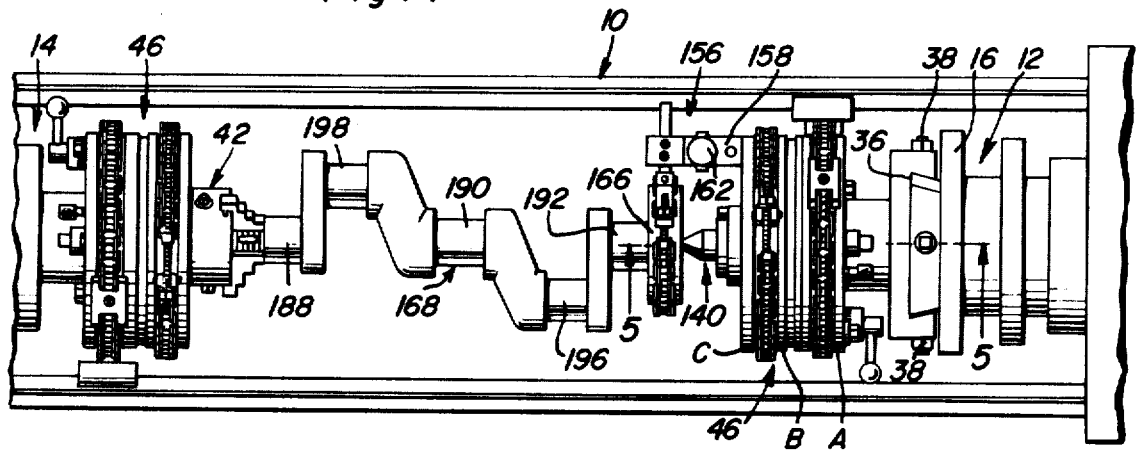
Figure 3:
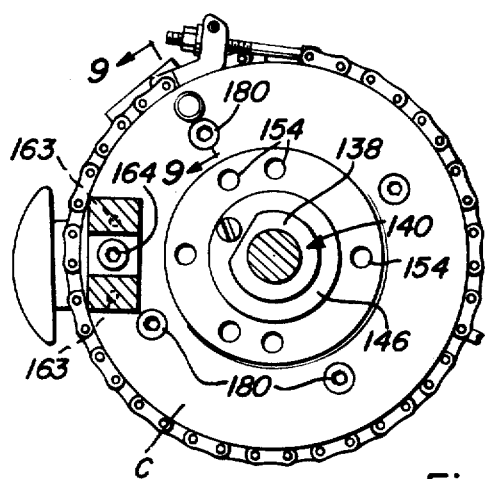
FIG. 3 is a vertical sectional view taken substantially upon a plane indicated by section line 3—3 of FIG. 2.
Figure 4:
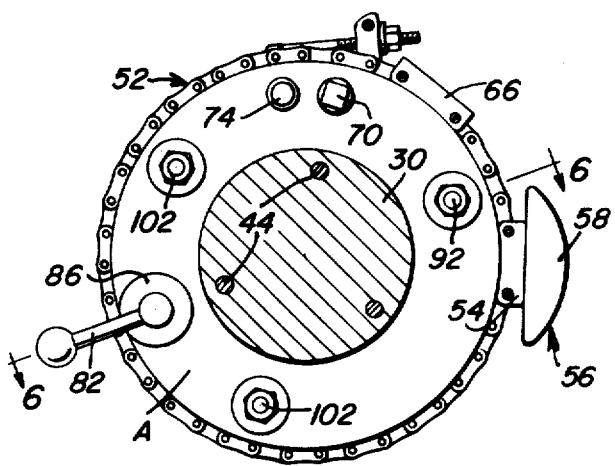
FIG. 4 is a vertical sectional view taken substantially upon a plane indicated by section line 4—4 of FIG. 2.

Referring now more specifically to the drawings, the numeral 10 generally designates a lathe including a driven headstock referred to in general by the reference numeral 12 and a tailstock referred to in general by the reference numeral 14. The headstock includes a mounting plate 16 secured thereto by means of fasteners 18 and provided with a pair of elongated longitudinally spaced and aligned dovetailed projections 20 and 22 disposed along a diameter of the axis of rotation of the headstock 12. The projection 20 includes a smooth bore 24 aligned with a smooth bore 26 formed longitudinally through the projection 22 and an externally threaded screw shaft 28 is journalled through the bores 24 and 26. A slide block 30 is provided and includes a cylindrical end portion 32 and a channel-shaped end portion 34. The channel-shaped end portion defines a dovetailed channel or groove in which the projections 20 and 22 are slidingly received and includes a projection 33 disposed between projections 20 and 22 provided with a threaded bore 35 aligned with bores 24 and 26 and in which the screw shaft 28 is threadedly engaged. A wedge block 36 is also provided within a channel-shaped end portion whereby the dovetailed projections 20 and 22 may be tightly secured in position within the channel-shaped end portion 34 by means of setscrews 38 carried by the opposite side portions of the channel-shaped portion 34 of the block 30 after the channel-shaped end portion 34 has been shifted to the desired position relative to projections 20 and 22 by the screw shaft 28.

The cylindrical end portion 34 has three threaded blind bores 40 formed therein by which a conventional chuck referred to in general by the reference numeral 42 may be secured to the block 30. A plurality of fasteners 44 pass through the chuck 42 and secured in the bores 40 may be utilized for supporting the chuck 42 to the block 30.

The foregoing description may be considered as conventional in that the mounting structure of the instant invention is to be secured to the block 30 in lieu of the conventional chuck 42 although it is to be understood, as will be hereinafter more fully set forth, that the mounting structure of the instant invention is constructed in a manner whereby it may be readily utilized in lieu of a conventionally mounted chuck such as chuck 42.

The mounting structure of the instant invention is referred to in general by the reference numeral 46 and includes three circular plates A, B and C. The plate A may best be seen in FIGS. 4–7. The plate A includes a pair of axially spaced circumferentially extending and outwardly opening grooves 48 in which the opposite side links 50 of a roller chain construction referred to in general by the reference numeral 52 are received to prevent shifting of the roller chain assembly 52 axially of the disk or plate A. The roller chain assembly has interposed therein the mounting block of a counterbalanced weight assembly referred to in general by the reference numeral 56. The counterbalance weight assembly 56 includes a body portion 58 which is hollow and closed by a removable plug (not shown). The plug may of course be removed so that the interior of the body 58 may be filled with any suitable fluent weighting material. In addition, the roller chain assembly 52 has a tensioning block 60 interposed therein including a setscrew 62 which may be turned inwardly to tension the roller chain assembly 52 and lock the latter against movement about the periphery of the disk or plate A.

The plate A also includes a partial cylindrical recess 64 in which a small diameter sprocket wheel 66 is journalled by means of a shaft 68 upon which the sprocket wheel 66 is mounted and which is journalled from the plate A and includes a non-circular exposed outer end portion 70 engageable by a wrench from the exterior of the plate A in order to rotate the sprocket wheel 66. Further, the plate A also includes a stop pin 72, see FIG. 7, including a knurled head portion 74, see FIG. 2, which may be shifted in a limited manner axially of the plate A in order to place the inner end of pin 72 between adjacent teeth 76 of the sprocket wheel 66 and to retract the inner end of the pin 72 from between adjacent sprocket teeth 76. Of course, when the inner end of the pin 72 is disposed between adjacent sprocket teeth 76, the sprocket wheel 66 is locked against rotation and therefore the counterbalance weight assembly 56 is releasably retained in position relative to the plate A.

With further attention invited to FIG. 7 of the drawings it may be seen that the plate A includes a threaded bore 78 in which a threaded shank portion 80 is threadedly engaged. The shank portion 80 projects from the side of the plate A remote from the plate B and includes a laterally directed handle portion 82. Further, the end of the shank portion 80 remote from the handle or handle portion 82 includes an eccentrically mounted pin 84 for a purpose to be hereinafter more fully set forth. A sleeve member 86 is disposed on the face of the plate A remote from plate B and has a smooth bore formed therethrough through which the outer end of the shank portion 80 extends. The sleeve member 86 includes a setscrew 90 engageable with the shank portion 80 and therefore the latter may be releasably retained in adjusted rotated position.

The plates A and B have a pair of registered bores 92 and 94 formed therethrough and the bores 92 and 94 include counterbores 92' and 94' in which bearing assemblies 92" and 94" are secured. A headed pivot pin or shank 96 extends through the bearing assemblies 92" and 94" and is secured through the side of the plate A remote from the plate B by means of a suitable threaded fastener 98. Accordingly, it may be seen that the plate B may be oscillated relative to the plate A about the pivot pin or shank 96.

The plate A includes a pair of elongated openings 100 formed therethrough extending generally along an arcuate path having the bore 92 as its center and a pair of headed bolts 102 are passed through the slots or openings 100 and threadedly engaged in threaded bores 104 formed through the plate B. Thus, the bolts 102 may be utilized to retain the plate B in adjusted oscillated position relative to the plate A.

The plate B includes a generally radially extending slot 106 formed therethrough in which a rectangular slide 108 is captive and the slide 108 has a smooth bore 110 formed therethrough in which the eccentric pin 84 carried by the threaded shank portion 80 is rotatably received. Thus, the bolts 102 may be loosened and the handle 82 may be utilized to turn the threaded shank portion 80 whereby the eccentric pin 84 and the slide 108 in the slot 106 will cause the plate B to be oscillated relative to the plate A, the plate A including indicia 112 registered with indicia 114 formed on the sleeve member 86. Of course the indicia 114 on the sleeve member 86 may be such so as to indicate the actual angular displacement of the plate B relative to the plate A about the pivot pin or shank 96 as opposed to the angular displacement of the sleeve member 86 relative to the plate A upon rotation of the threaded shank portion 80.

The plates A, B and C have aligned bores 116, 118 and 120 formed therethrough and the bore 118 includes a counterbore 118' in which a self-centering bearing assembly referred to in general by the reference numeral 122 is seated. The bore 120 has a sleeve 124 secured therein and the sleeve 124 includes a projecting end portion which is snugly received within the self-centering bearing assembly 122. The plate B and the plate C have circumferential grooves 126 and 128 similar to grooves 48 in which the opposite side links 130 of a second roller chain assembly referred to in general by the reference numeral 132 are received. The roller chain assembly 132 includes coacting end portions 134 and 136 which may be utilized to tighten the chain assembly 132 about the peripheries of the plates B and C and accordingly, the roller chain assembly 132 may be utilized to retain the plates B and C together against axial separation, relative radial displacement of the plates B and C being prevented by the extended end portion of the sleeve 124 being snugly received in the self-centering bearing assembly 122.

The end of the bore 120 remote from the plate B includes a counterbore 120' and the counterbore 120' is non-circular to snugly receive either complementary non-circular shoulders 136 and 138 carried by opposite ends of a center body referred to in general by the reference numeral 140. The center body 140 includes a pair of opposite end center points 142 and 144 which maye be selectively used depending upon the manner in which the center body is secured to the plate C by means of a fastener 144 passed through the radially extending shoulder 146 on the body 140 and secured in the threaded bore 148 disposed just outside the bore 120 formed in the plate C.

It may be seen that the cylindrical end portion 32 is seatingly received in a shallow cylindrical recess 148 formed in the plate A and that the plate C includes an axially projecting cylindrical projection 150 of the same diameter whereby the conventional chuck 42, which includes a cylindrical recess (not shown) similar to the recess 148, may be secured to the plate C, the latter including circumferentially spaced bores 154 which may be used in various combinations thereof in order to secure a three bolt hole or a four bolt hole chuck such as chuck 42 to the plate C, the bores 154 being threaded.

A clamp or support assembly generally referred to by the reference numeral 156, see FIG. 1, is provided and is substantially identical to the clamp or support assembly specifically illustrated and described in my above-mentioned copending application U.S. Ser. No. 525,721 and referred to in general by the reference numeral 60 therein. The clamp or support assembly 156 differs slightly from the assembly disclosed in my copending application in that it includes a U-shaped bracket 158 between whose arms 160 the mounting block corresponding to the mounting block 76 in my copending application is supported by means of adjusting screws 162 corresponding to the support and adjusting screws 56 in my copending application. The portion of the U-shaped bracket 158 disclosed herein and extending between the arms 160 includes a pair of non-symmetrically placed pins 163 receivable in blind bores (not shown) opening outwardly through the opposing surface of the plate C and a single threaded bolt 164 is passed through the portion of the U-shaped bracket 158 connecting the arms 160 and threadedly secured in a threaded bore also opening outwardly of the confronting face of the plate C between the blind bores in which the aforementioned pins are received. Thus, the U-shaped bracket 158 is readily removably supported from the plate C.

The clamp or support assembly 156 is engaged with the end flange 166 of a crankshaft referred to in general by the reference numeral 168 and the other end of the crankshaft 168 is supported by a chuck such as chuck 42 secured to a second mounting structure 46 mounted on the tailstock 14 of the lathe 10.

The plate C further includes an indexing pin 170 reciprocal through a bore 172 formed through the plate C and the indexing pin 170 has a flattened portion 174 thereon, see FIG. 9, against which a setscrew 176 carried by the plate C bears to limit axial shifting of the pin 170. The pin 170 includes a knurled outer head portion 172 disposed exteriorly of the plate C and the inner end of the indexing pin 172 is receivable in any one of four circumferentially spaced sets of circumferentially spaced bores 178 formed through and spaced about the outer periphery of the plate B. There are four sets of bores 178 with three bores 178 in each set. By utilizing the indexing pin 172 in the bores 178, the plate C may be indexed precisely relative to the plate B in order to achieve 45°, 60°, 90°, 120° or 180° of the crank shaft 168.

If rotation of the plate C relative to the plate B will not be required, four bolts 180 may be utilized and passed through bores 182 provided with counterbores 184 formed in the plate C and threadedly engaged in corresponding threaded bores 186 formed through the plate B. Of course, the utilization of the bolts 180 will prevent adjustable indexing of the plate C relative to the plate B by means of the indexing pin 172.

From the foregoing, it may be readily appreciated that the crankshaft 168 may be supported between the headstock 12 and the tailstock 14 in order to grind the main pins 188, 190 and 192 of the crankshaft 168. In addition, a clamp or support assembly corresponding to the assembly 156 supported from the headstock 12 may be utilized on the mounting structure 46 carried by the tailstock 14 and the tailstock 14 may also be provided with structure corresponding to the structures 20–38 in order that the crankpins 196 and 198 may be properly aligned with the axes of rotation of the headstock 12 and the tailstock 14 for grinding these crankpins. Of course, the mounting structures 46 may also be utilized to support workpieces other than crankshafts having various portions thereof to be worked upon which must be properly aligned with the axes of rotation of the headstock 12 and tailstock 14.

Figure 10:
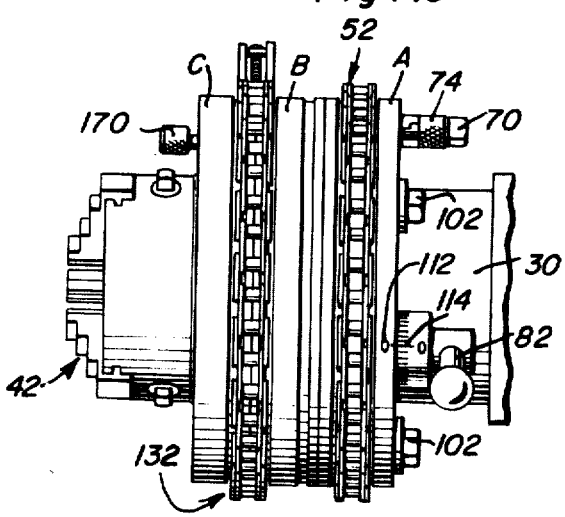
FIG. 10 is a fragmentary side elevational view of the headstock of the lathe illustrating the manner in which a conventional chuck may be mounted on the mounting structure in lieu of the clamp structure illustrated in FIG. 1.

From FIG. 10 of the drawings it may be seen that the chuck 42 may be mounted on the support structure 46 in lieu of the separate body 140 and that such a chuck 42 may be utilized to support a workpiece in lieu of the clamp or support assembly 156. Further, although the mounting structure 46 is illustrated and described herein as being operatively associated with a lathe, it is to be noted that the mounting structure can be used in connection with any machine including a suitable journalled support member such as a crankshaft grinding machine.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within, the scope of the invention as claimed.

What is claimed as new is as follows:

1. In combination with a support member rotatable about a first axis, a mounting member defining a center with which a workpiece is to be at least approximately centered, securing means securing said mounting member to said support member for rotation therewith and for angular adjustment of said mounting member relative to said support member about a second axis generally paralleling said first axis and spaced transversely of said center, and support structure carried by said mounting member and to supportingly engage a portion of said workpiece adjacent said mounting member and to support said portion in approximately centered position relative to said center, said securing means also including means supporting said mounting member on said support member on said support member for full 360 degree angular adjustment relative to said support member, independent of rotation of said mounting member about said second axis, about a third axis generally paralleling said first axis and coinciding with said center.

2. The combination of claim 1 wherein said securing means further includes means securing said mounting member to said support member for rectilinear adjustment of said mounting member relative to said support member along a path generally normal to said first axis.

3. The combination of claim 2 wherein said path intersects with said first axis.

4. The combination of claim 1 including counterbalance weight means carried by said securing means, spaced radially outwardly from said center and adjustably shiftable about said center.

5. The combination of claim 4 wherein said counterbalance weight means includes means whereby its effective weight may be selectively varied.

6. The combination of claim 1, said securing means and said mounting member also including indexing means operative to releasably retain said mounting member in predetermined adjusted rotated positions about said third axis.

7. In combination with a base rotatable about a first axis, a driving structure including first, second and third members, first means supporting said first member from said base for rotation therewith, second means supporting said second member from said first member for adjustable swinging relative to said first member about a second axis generally paralleling said first axis, third means supporting said third member from said second member for rotation relative thereto about a third axis generally paralleling said first and second axes, said third member including fourth means defining a center with which a workpiece is to be at least approximately centered, said center generally coinciding with said third axis.

8. The combination of claim 7 wherein said fourth means includes means for engaging and supporting a portion of said workpiece with said portion in approximately centered position relative to said center.

9. The combination of claim 7 wherein said first means includes means operative to adjustably shift said first member relative to said base along a path generally normal to said first axis.

10. The combination of claim 7 wherein said first member includes counterbalance means carried thereby spaced radially outwardly of and adjustably shiftable about said third axis.

References Cited

UNITED STATES PATENTS

| 2,447,334 | 8/1948 | Healy | 82—40 |
| 3,183,012 | 5/1965 | Watson | 279—6 |

LEONIDAS VLACHOS, Primary Examiner

U.S. Cl. X.R.

279—6